United States Patent
Tsay (10) Patent No.: US 9,062,749 B2
(45) Date of Patent: Jun. 23, 2015

(54) HIDDEN BRAKING ASSEMBLY

(71) Applicant: Ching-Tsang Wu, Xinbei (TW)

(72) Inventor: Shern-Ji Tsay, Kaohsiung (TW)

(73) Assignee: Ching-Tsang Wu, Xinbei (TW)

( * ) Notice: Subject to any disclaimer, the term of this patent is extended or adjusted under 35 U.S.C. 154(b) by 104 days.

(21) Appl. No.: 14/025,096

(22) Filed: Sep. 12, 2013

(65) Prior Publication Data
US 2014/0076090 A1    Mar. 20, 2014

(30) Foreign Application Priority Data
Sep. 19, 2012    (TW) .............................. 101218057 A (51) Int. Cl.
| | |
|---|---|
| F16H 21/44 | (2006.01) |
| B60T 1/04 | (2006.01) |
| B60T 7/10 | (2006.01) |
| B60T 11/04 | (2006.01) |
| F16D 49/00 | (2006.01) |
| F16D 125/60 | (2012.01) |
| A61H 3/04 | (2006.01) |

(52) U.S. Cl.
CPC ............ *F16H 21/44* (2013.01); *Y10T 74/20396* (2015.01); *B60T 1/04* (2013.01); *B60T 7/102* (2013.01); *B60T 7/108* (2013.01); *B60T 11/04* (2013.01); *B60T 11/046* (2013.01); *F16D 49/00* (2013.01); *F16D 2125/60* (2013.01); *A61H 2003/046* (2013.01); *A61H 2201/0192* (2013.01)

(58) Field of Classification Search
CPC ........ B62K 15/00; B62K 3/002; B62D 1/184; F16H 21/44; F16D 2125/60; F16D 49/00; A61H 2003/046
USPC .......... 188/24.18, 24.22; 280/87.041; 74/491, 74/493; 190/18 A
See application file for complete search history.

(56) References Cited

U.S. PATENT DOCUMENTS

| | | | | |
|---|---|---|---|---|
| 5,161,425 | A  * | 11/1992 | Baskett et al. ................... | 74/493 |
| 6,182,981 | B1 * | 2/2001 | Kuo ................................. | 280/37 |
| 6,283,484 | B1 * | 9/2001 | Malmstrom ............. | 280/87.041 |
| 6,401,888 | B1 * | 6/2002 | Kuo ............................ | 190/18 A |
| 6,442,797 | B1 * | 9/2002 | Yang et al. ................... | 16/113.1 |
| 2006/0237935 | A1 * | 10/2006 | Lonkvist .................. | 280/87.021 |

* cited by examiner

Primary Examiner — Xuan Lan Nguyen
(74) Attorney, Agent, or Firm — Rosenberg, Klein & Lee (57) ABSTRACT

A hidden braking assembly provides a connecting unit disposed inside a main frame. The connecting unit comprises an upper stem connected to a brake handle, a lower stem connected to a brake unit, and an adjusting set fixed to the lower stem and penetrated by the upper stem. A locking part of the adjusting set is operated to quickly adjust a telescoping length of an upper and a lower frame of the main frame. The connecting unit is synchronically adjusted during the adjustment of the upper frame and the lower frame. After the adjustment, the locking part is fixed to a body part of the adjusting set so that the two frames and the two stems can be firmly positioned, thereby facilitating a rapid adjustment of the telescoping length of the main frame and the connecting unit, increasing a using convenience, and attaining a stable braking effect.

4 Claims, 7 Drawing Sheets

HIDDEN BRAKING ASSEMBLY

BACKGROUND OF THE INVENTION

1. Field of the Invention

The present invention relates to a brake device, particular to a hidden braking assembly disposed inside the frame.

2. Description of the Related Art

Figure 1:
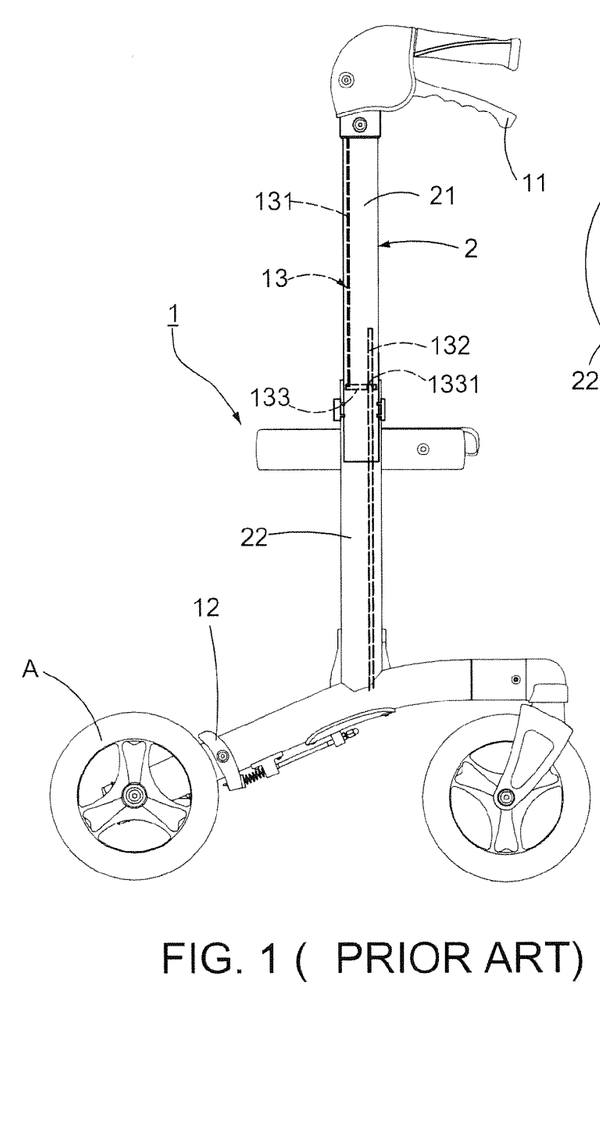
FIG. 1 is a schematic view showing a prior art.

Referring to FIG. 1, a conventional hidden brake device 1 comprises a brake handle 11, a brake member 12 controlling a stop of a wheel set A, and a connecting member 13 connecting the brake handle 11 and the brake member 12. Wherein, the connecting member 13 is disposed in a frame 2 which is made of telescoping upper and lower frames 21, 22. The connecting member 13 comprises an upper stem 131 connected to the brake handle 11, a lower stem 132 connected to the brake member 12, and a junction part 133 respectively connected to the upper frame 131 and the lower stem 132. A hole 1331 is formed on the junction part 133. The upper stem 131 is fixed to one end of the junction part 133. The lower stem 132 is disposed to penetrate the hole 1331.

Figure 2:
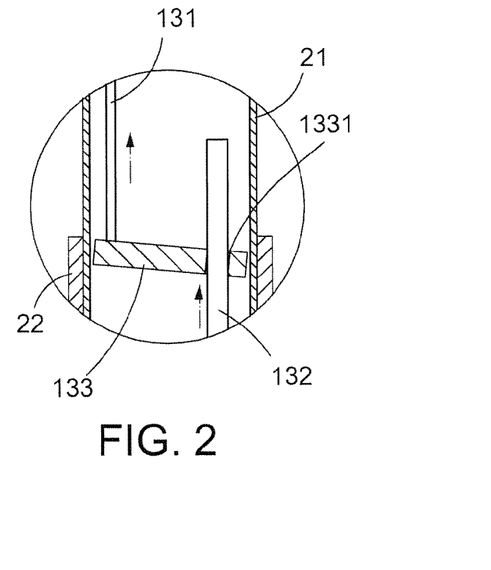
FIG. 2 is an enlarged schematic view showing a braking status of the prior art.

When the upper frame 21 and the lower frame 22 are telescopically adjusted, the lower stem 132 slides over the junction part 133 directly, and concurrently the upper stem 131 moves to an adequate place along with the frames 21, 22. Referring to FIG. 2, while braking by using the brake handle 11, the user pulls the brake handle 11 to pull the upper stem 131 upward. In this manner, the junction part 133 is formed into an inclined state, which renders the lower stem 132 able to be engaged with the hole 1331 and thus allows the lower stem 132 to be activated by the upper stem 131 in order to drive the brake member 12 to brake. However, a long-term and repeat braking operation causes the hole 1331 and the lower stem 132 to be easily worn away and causes a size of the hole 1331 to be gradually enlarged. If the hole 1331 is enlarged, the lower stem 132 cannot be engaged with the hole 1331 at time of pulling the junction part 133 upward by the upper stem 131. Therefore, the problem of brake failure is brought about.

Further, the user has to grip the brake handle 11 continuously to ensure that the braking effect of the brake member 12 functions. When the user releases the brake handle 11, the brake member 12 loses the braking effect, namely the hidden braking device 1 cannot attain a brake-locking status without the user's operation.

SUMMARY OF THE INVENTION

The object of the present invention is to provide a hidden braking assembly rapidly and firmly completing an adjustment of the length of the main frame, increasing a using convenience and attaining a stable braking effect.

The hidden braking assembly in accordance with the present invention mainly comprises a brake handle, a brake unit controlling a stop of a wheel set, and a connecting unit connecting the brake handle and the brake unit. The connecting unit is disposed inside a main frame. The connecting unit comprises an upper stem connected to the brake handle, a lower stem connected to the brake unit, and an adjusting set fixed to the lower stem and penetrated by the upper stem. The adjusting set includes a body part fixed to the lower frame, a locking part pivotally disposed on the body part for being inserted into spaced-apart apertures of the upper frame, and a junction part propelled by the locking part and disposed to connect the upper stem and the lower stem. Accordingly, by the concatenation of the adjusting set, the locking part is directly operated to quickly adjust a telescoping length of the upper frame and the lower frame while adjusting the main frame telescopically. The upper stem and the lower stem can be synchronically adjusted during the adjustment of the upper frame and the lower frame. After an adjustment, the locking part is fixed to the body part so that the upper frame and the lower frame of the main frame and the upper stem and the lower stem of the connecting unit are firmly positioned by the locking part. Therefore, the present invention quickly finishes a telescopic adjustment of the length of the main frame and the connecting unit, increases a using convenience, and allows the lower stem to activate the brake unit to attain a smooth and stable braking effect.

The junction part as aforementioned includes a seat member fixed to the lower stem and penetrated by the upper stem, a supporting member disposed on the seat member for engaging with the upper stem, and an elastic member disposed between the seat member and the supporting member. A fixing portion is formed on the upper stem and disposed to face the supporting member, and a fitting portion is formed on the supporting member and disposed to face and engage with the fixing portion. The fitting portion has a plurality of teeth disposed thereon. The locking part is inserted into any of the apertures of the upper frame for propelling the supporting member, whereby the fitting portion engages with the fixing portion firmly for positioning the aforementioned stems and the frames.

Preferably, a rolling ball is pivotally disposed on the locking part and disposed to face the supporting member.

Preferably, the supporting member includes a slot formed opposite to the upper stem and a second supporting member disposed on the slot. The fitting portion is disposed on the second supporting member, and a spring is disposed between the second supporting member and the slot.

Preferably, a brake fixing device is disposed between the upper stem and the brake handle. The brake fixing device comprises a housing fixed to the upper frame, a sliding part disposed inside the upper frame for allowing the upper stem to be disposed thereon, a retrieving part disposed between the sliding part and the housing, an activating part pivotally disposed on the housing and driven by the brake handle, and a connecting part respectively connected to the sliding part and the activating part. A wing is extended outward from the activating part, and a protrusion is extended at one end of the brake handle so that the protrusion is able to propel the wing.

The advantages of the present invention over the known prior arts are more apparent to those of ordinary skilled in the art upon reading following descriptions in junction with the drawings.

DETAILED DESCRIPTION OF THE PREFERRED EMBODIMENTS

Before describing in greater detail, it should note that the like elements are denoted by the same reference numerals throughout the disclosure.

Figure 3:
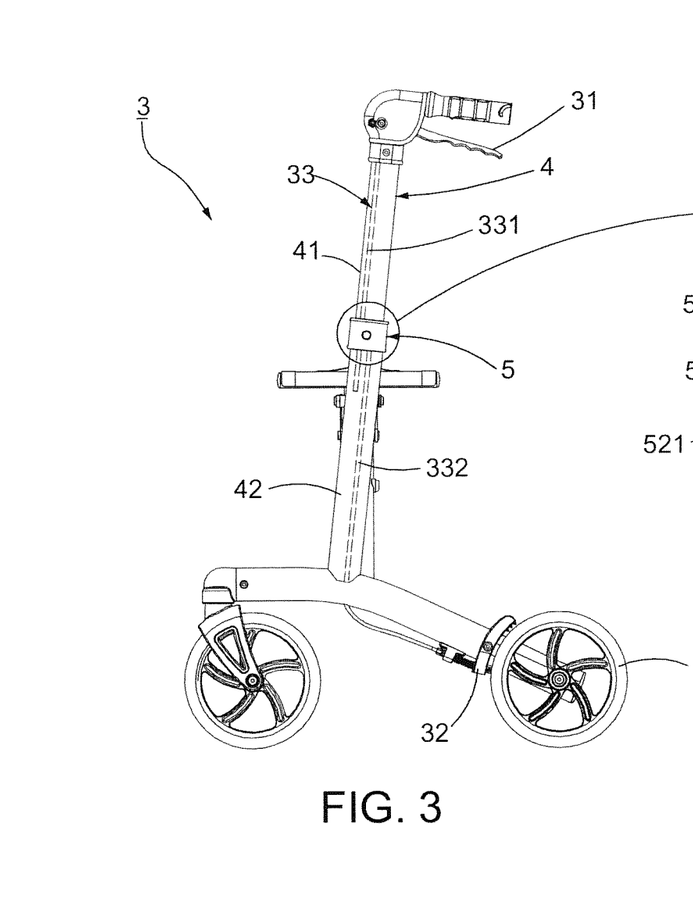
FIG. 3 is a perspective view showing a first preferred embodiment of the present invention.

Referring to FIG. 3, a first preferred embodiment of a hidden braking assembly 3 of the present invention is installed in a main frame 4. The main frame 4 has an upper frame 41 and a lower frame 42 telescoping with each other. A plurality of spaced-apart apertures 412 are formed on the upper frame 41. The hidden braking assembly 3 comprises a brake handle 31, a brake unit 32 controlling a stop of a wheel set A, and a connecting unit 33 connecting the brake handle 31 and the brake unit 32. The connecting unit 33 is disposed inside the main frame 4. Wherein, the connecting unit 33 comprises an upper stem 331 connected to the brake handle 31, a lower stem 332 connected to the brake unit 32, and an adjusting set 5 respectively connected to the upper stem 331 and the lower stem 332.

Figure 4:
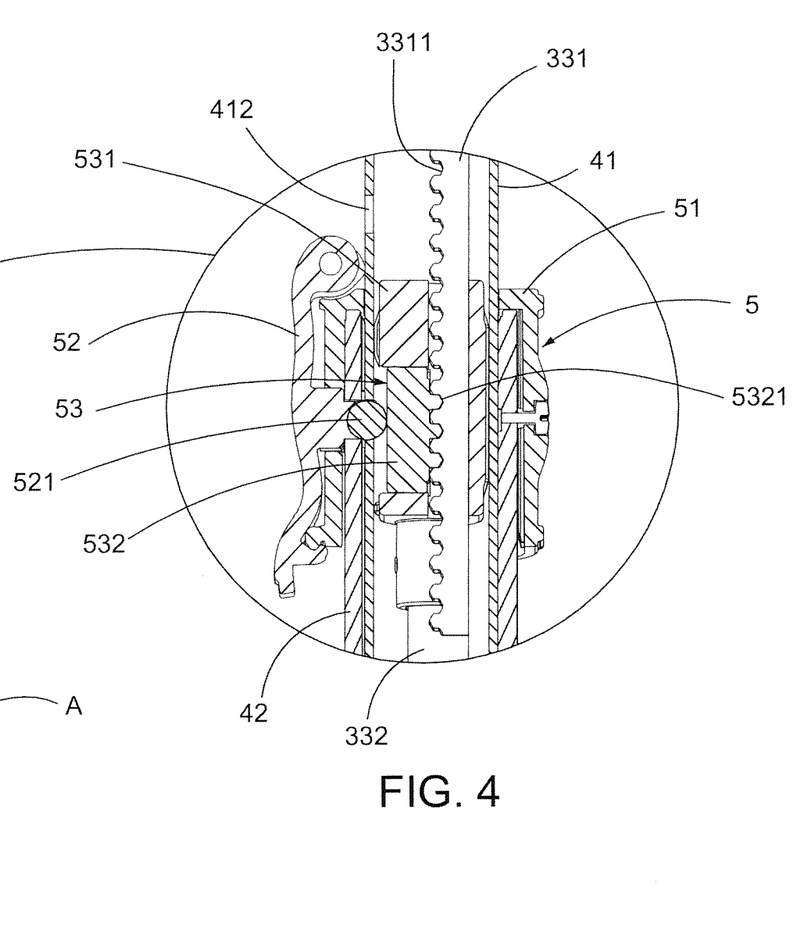
FIG. 4 is a cross-sectional view showing the element of the first preferred embodiment.
Figure 5:
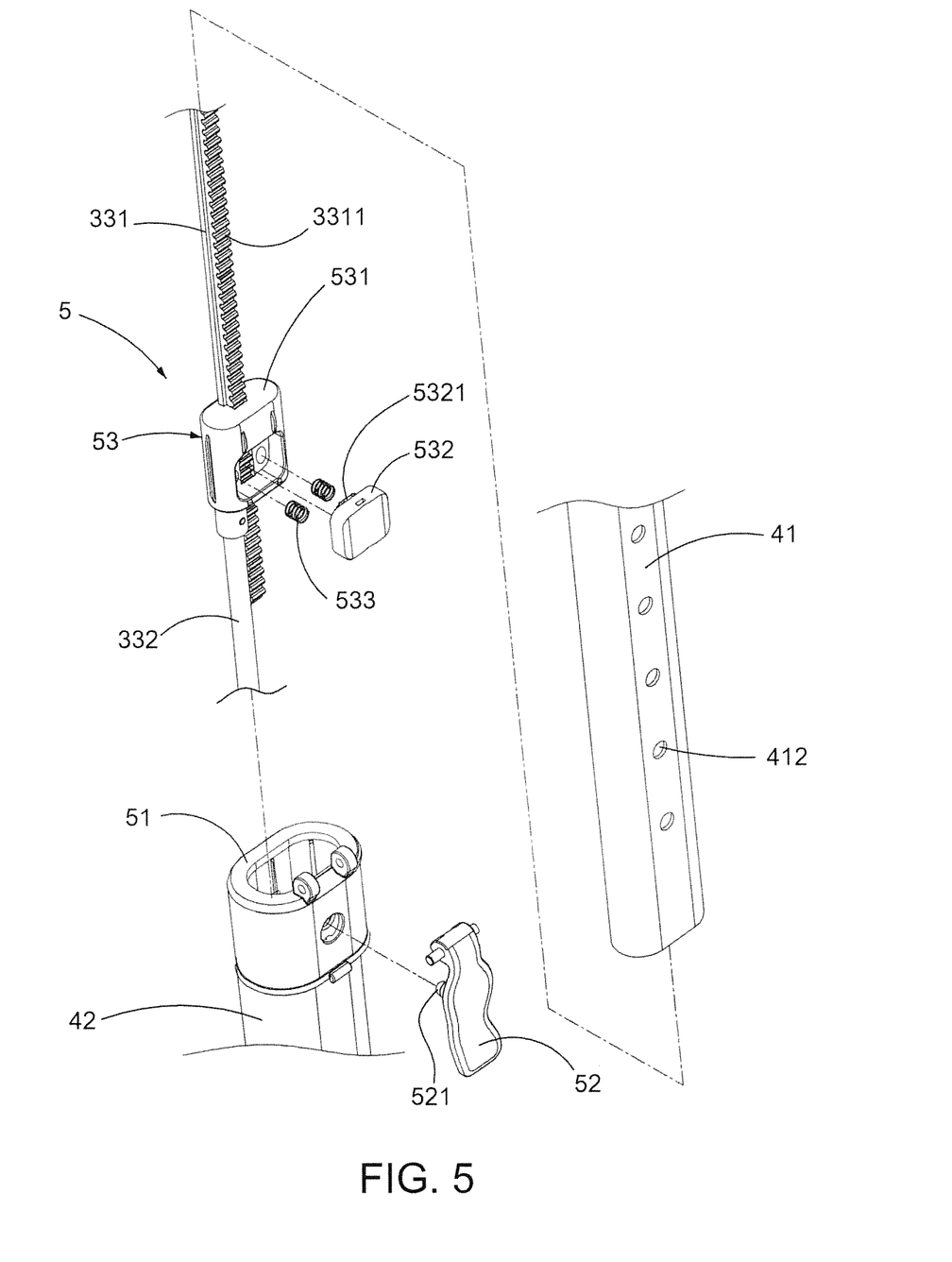
FIG. 5 is an exploded view showing the first preferred embodiment.

Referring to FIG. 4 and FIG. 5, the adjusting set 5 includes a body part 51 fixed to the lower frame 42, a locking part 52 pivotally disposed on the body part 51 for being inserted into the apertures 412, and a junction part 53 propelled by the locking part 52 and disposed to connect the upper stem 331 and the lower stem 332. A fixing portion 3311 is formed on the upper stem 331. The shape of the fixing portion 3311 is not restricted and herein a tooth-like shape is adopted in this preferred embodiment. Further, in this preferred embodiment, a rolling ball 521 is pivotally disposed on the locking part 52 and disposed to face a supporting member 532 of the junction part 53 in order to prevent the locking part 52 from wearing the junction part 53 away.

Continuing with the aforesaid, the junction part 53 includes a seat member 531 fixed to the lower stem 332 and penetrated by the upper stem 331, a supporting member 532 disposed on the seat member 531 for engaging with the upper stem 331, and at least one elastic member 533 disposed between the seat member 531 and the supporting member 532. A fitting portion 5321 is formed on the supporting member 532 and disposed to face and engage with the fixing portion 3311. The shape of the fitting portion 5321 fits in that of the fixing portion 3311, for example, a plurality of teeth are formed on the fitting portion 5321 for fitting in the tooth-like fixing portion 3311. Further, two elastic members 533 are adopted in the preferred embodiment. When the locking part 52 is inserted into the aperture 412, the rolling ball 521 propels the supporting member 532 as illustrated.

Figure 6:
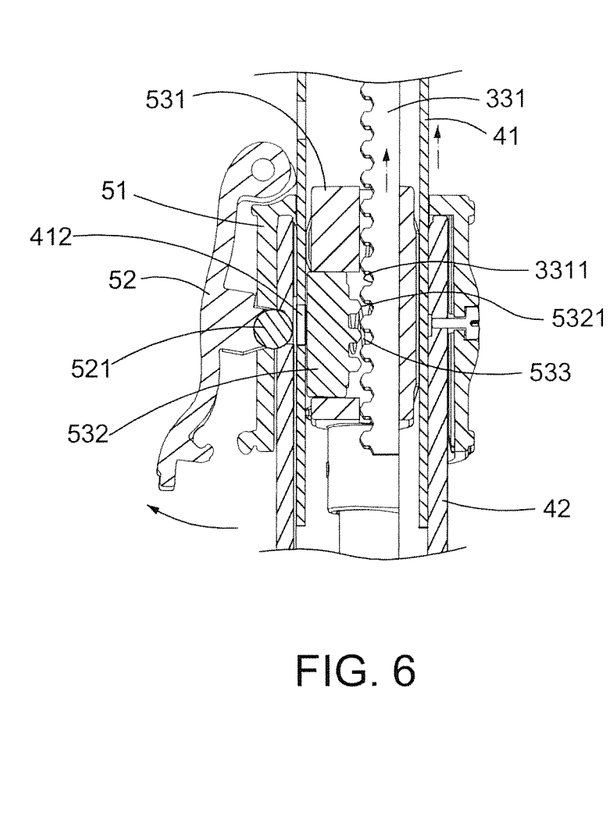
FIG. 6 is a schematic view showing an operation of the first preferred embodiment to adjust a telescoping length of the main frame.
Figure 7:
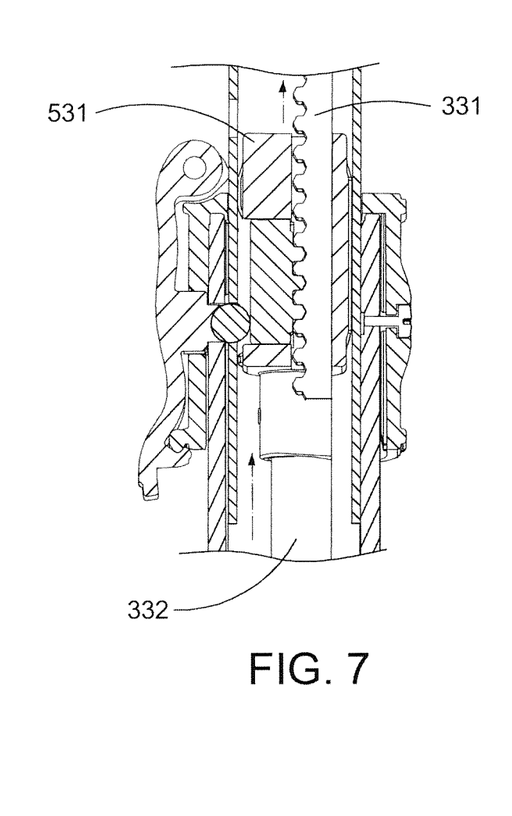
FIG. 7 is a further schematic view showing the operation of the first preferred embodiment while pulling the brake handle.

Referring to FIG. 3 and FIG. 6, if the user wishes to adjust a length of the main frame 4, the locking part 52 is moved out of the body part 51 to separate the locking part 52 from the supporting member 532 and the aperture 412 and thence activate a telescopic adjustment between the upper frame 41 and the lower frame 42. Concurrently, the elastic member 533 between the supporting member 532 and the seat member 531 propels the supporting member 532 away from the upper stem 331, namely propels and separates the fitting portion 5321 from the fixing portion 3311, whereby when the upper frame 41 and the lower frame 42 are telescopically adjusted, the upper stem 331 is able to follow the telescoping action between the upper frame 41 and the lower frame 42 for synchronically moving over the seat member 531. After the main frame 4 finishes the adjustment, the locking part 52 is moved back to the body part 51 for holding and positioning. The locking part 52 is inserted into the aperture 412 to allow the rolling ball 521 to propel the supporting member 532, thereby securing the upper frame 41 and the lower 42, allowing the fitting portion 5321 of the supporting member 532 to be engaged with the fixing portion 3311 firmly and causing the upper frame 331 to be firmly positioned on the seat member 531 (as clearly shown in FIG. 4). Referring to FIG. 7, when the user pulls the brake handle 31, the upper stem 331 which is pulled upward drives an upward move of the lower stem 332 via the seat member 531 so that the lower stem 332 can drive the brake unit 32 to brake stably. Therefore, the design of the adjusting set 5 allows the locking part 52 to position the frames 41, 42 and the stems 331, 332 concurrently and stably, which facilitates a rapid completion of the telescopic adjustment and position of the length of the main frame 4 and the connecting unit 33, increases a using convenience, and achieves a stable braking effect.

Figure 8:
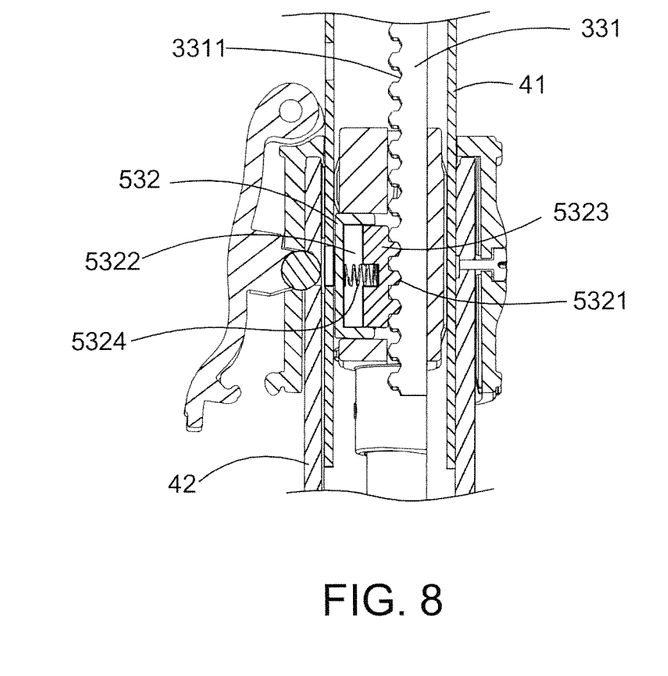
FIG. 8 is a cross-sectional view showing a second preferred embodiment of the present invention.
Figure 9:
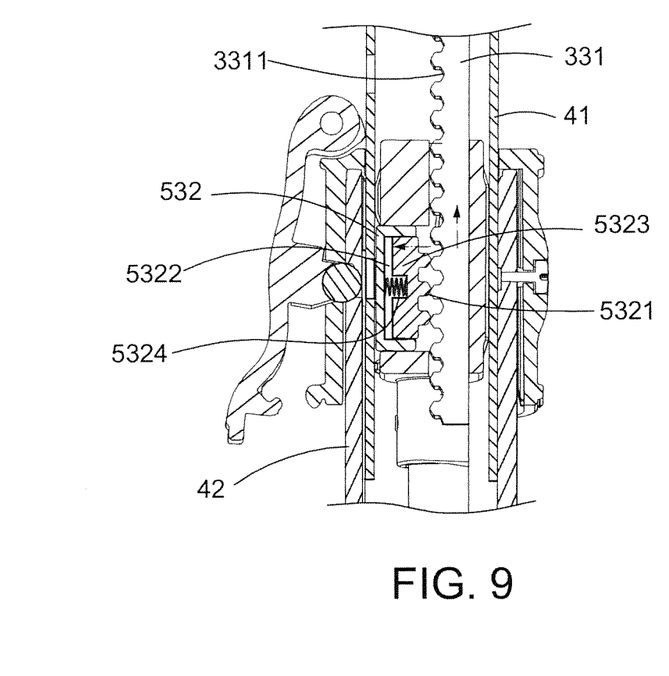
FIG. 9 is a schematic view showing an operation of the second preferred embodiment to adjust a telescoping length of the main frame.

Referring to FIG. 8, a second preferred embodiment of a hidden braking assembly 3 of the present invention is characterized in that the supporting member 532 includes a slot 5322 formed opposite to the upper stem 331 and a second supporting member 5323 disposed on the slot 5322. The fitting portion 5321 is disposed on the second supporting member 5323, and a spring 5324 is disposed between the second supporting member 5323 and the slot 5322. Accordingly, when the supporting member 532 separates from the locking part 52, the second supporting member 5323 is still subject to a return force of the spring 5324 to make the fitting portion 5321 abut on the fixing portion 3311. If the upper frame 41 and the lower frame 42 are telescopically adjusted as shown in FIG. 9, an adjusting force larger than the return force can compress the spring 5324 and liberate the abutting relationship between the second supporting member 5323 and the fixing portion 3311 so that the second supporting member 5323 can move backwards and forwards by fitting in the shape of the fixing portion 3311. During each movement, if the fitting portion 5321 engages with the fixing portion 3311 again, the second supporting member 5323 is propelled by the return force of the spring 5324 again to force the fitting portion 5321 to move toward the fixing portion 331 and touch the fixing portion 3311, which thence makes a sound to remind the user that the frames 41, 42 fulfill each stage of the adjustment to increase an adjusting convenience.

Figure 10:
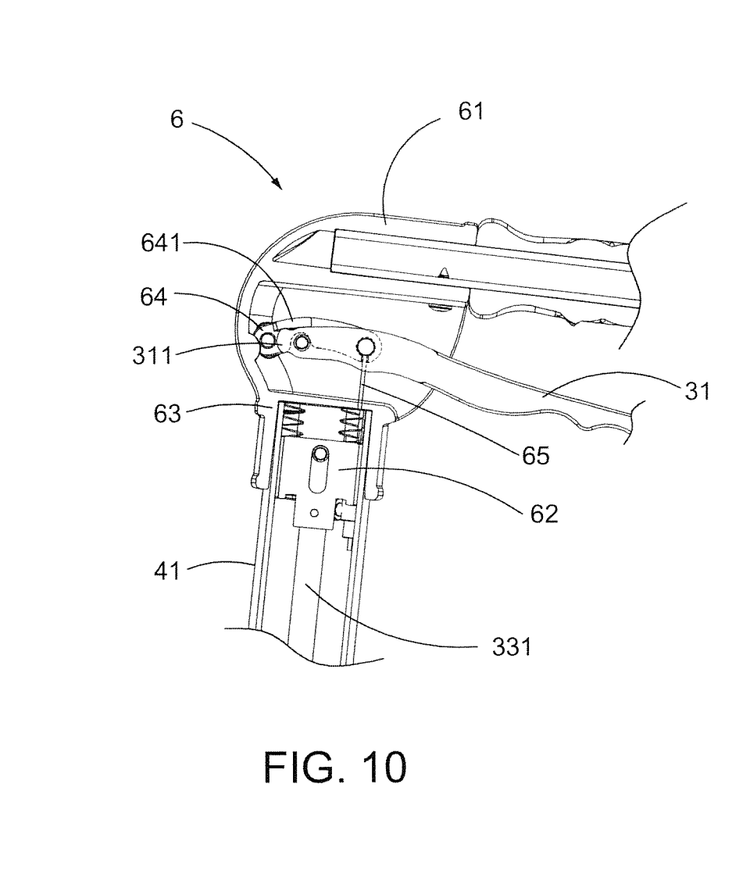
FIG. 10 is a cross-sectional view showing a third preferred embodiment of the present invention.
Figure 11:
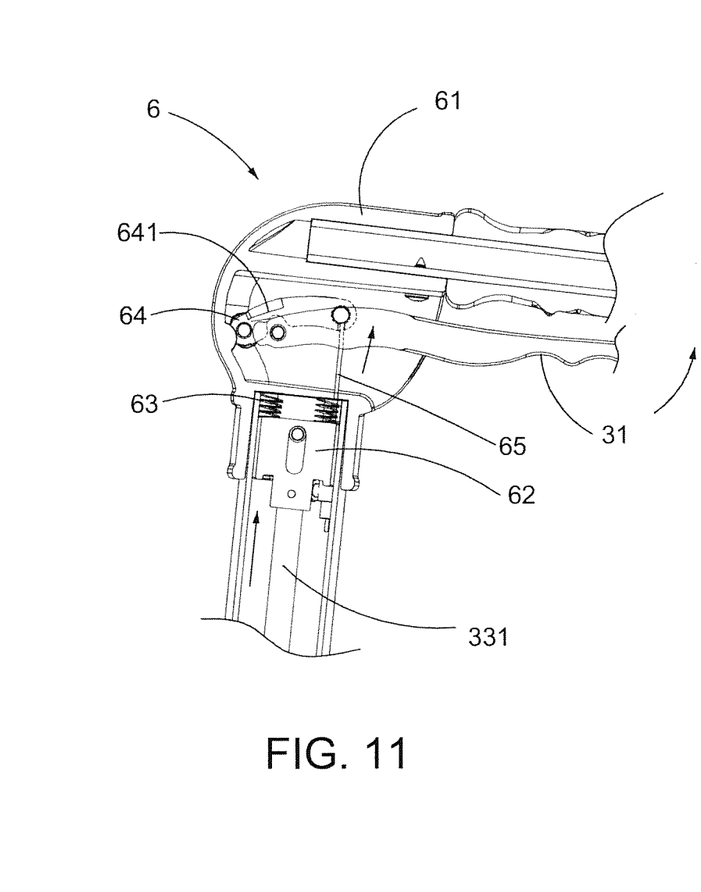
FIG. 11 is a schematic view showing the third preferred embodiment in a braking status.
Figure 12:
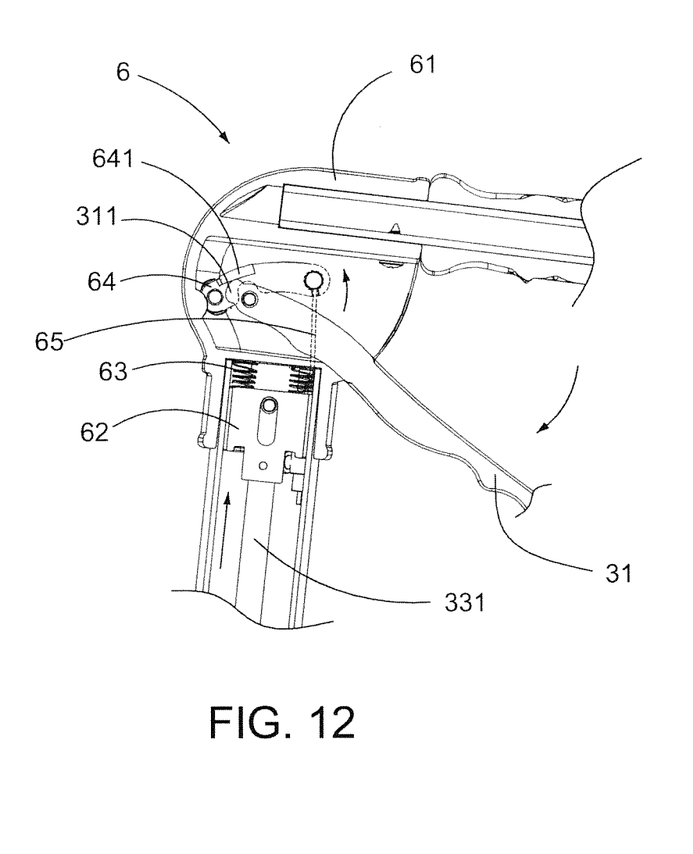
FIG. 12 is a further schematic view showing the third preferred embodiment in a brake-locking status.

Referring to FIG. 10, a third preferred embodiment of a hidden braking assembly 3 of the present invention is characterized in that a brake fixing device 6 is disposed between the upper stem 331 and the brake handle 31. The brake fixing device 6 comprises a housing 61 fixed to the upper frame 41, a sliding part 62 disposed inside the upper frame 41 for allowing the upper stem 331 to be disposed thereon, a retrieving part 63 disposed between the sliding part 62 and the housing 61, an activating part 64 pivotally disposed on the housing 61 and driven by the brake handle 31, and a connecting part 65 respectively connected to the sliding part 62 and the activating part 64. A wing 641 is extended outward from the activating part 64, and a protrusion 311 is extended at one end of the brake handle 31 so that the protrusion 311 can propel the wing 641. When the user wishes to brake, the user holds and pulls the brake handle 31 upward to allow the brake handle 31 to propel the activating part 64 so that the activating part 64 drives the connecting part 65 and the sliding part 62 upward as arrowed in FIG. 11 and then pulls the brake unit 32 (not shown in this figure). Thence the brake unit 32 stops a rotation of the wheel set A. When the user releases the brake handle 31, the retrieving part 63 pushes the sliding part 62 to bring the brake handle 31 to the original non-braking status (shown in FIG. 10). Referring to FIG. 12, if the user wishes to lock the wheel set A, this is achieved by depressing the brake handle 31 to allow the protrusion 311 of the brake handle 31 to push the wing 641 and drive one end of the activating part 63 to lift upward as arrowed, thereby controlling the brake unit 32 in a braking status. Concurrently, a downward pressing force of the brake handle 31 causes the protrusion 311 and the wing 641 to fix and lock with each other. In the interim, even if the user releases the brake handle 31, the brake handle 31 and the brake unit 32 do not return to the non-braking status. Instead, the wheel set A retains a brake-locking status.

If the user wishes to liberate the brake-locking status of the brake unit 32, this is achieved by pulling the brake handle 31 upward to separate the protrusion 311 from the wing 641. Therefore, the connecting unit 33, the connecting part 65, the sliding part 62, the brake handle 31, and the brake unit 32 can return to the non-braking status as shown in FIG. 10. Accordingly, the design of the brake fixing device 6 activates the brake unit 32 by using the brake handle 31 in order to attain multiple modes, such as a braking mode adapted to common driving actions and a brake-locking mode. Therefore, the hidden braking assembly 3 is much easier and convenient to use.

To sum up, the present invention takes advantage of the adjusting set which operates a locking part of the adjusting set to rapidly adjust the telescoping length between the upper frame and the lower frame of the main frame and concurrently adjust the connecting unit during the adjustment of the above frames. After the adjustment is done, the locking part is fixed to the body part of the adjusting set to attain a stable position of the upper frame and the lower frame of the main frame and the upper stem and the lower stem of the connecting unit, thereby completing a telescopic adjustment of the length of the main frame and the connecting unit and facilitating a stable braking effect. A brake fixing device can be preferably applied to activate the brake unit in a braking status or a brake-locking status, whereby the subject hidden braking assembly attains an easy and convenient operation and use.

While the embodiments in accordance with the present invention are shown and described, it is understood that further variations and modifications may be made without departing from the scope of the invention.

What is claimed is:

1. A hidden braking assembly comprising a brake handle, a brake unit controlling a stop of a wheel set, and a connecting unit which connects said brake handle and said brake unit; said connecting unit being installed inside a main frame, said main frame being made of an upper frame and a lower frame telescoping with each other;

wherein, said connecting unit comprising an upper stem connected to said brake handle, a lower stem connected to said brake unit, and an adjusting set respectively connected to said upper stem and said lower stem; said upper frame having a plurality of spaced-apart apertures defined thereon; said adjusting set including a body part fixed to said lower frame, a locking part pivotally disposed on said body part for being inserted into said apertures, and a junction part propelled by said locking part and disposed to connect said upper stem and said lower stem; said junction part including a seat member fixed to said lower stem and penetrated by said upper stem, a supporting member disposed on said seat member for engaging with said upper stem, and at least one elastic member disposed between said seat member and said supporting member; a fixing portion being formed on said upper stem and disposed to face said supporting member, and a fitting portion being formed on said supporting member and disposed to face and engage with said fixing portion, said fitting portion having a plurality of teeth disposed thereon; said locking part being inserted into said apertures for propelling said supporting member, whereby said fitting portion engages with said fixing portion firmly for connecting and positioning said upper stem and said lower stem of said connecting unit and said upper frame and said lower frame of said main frame.

2. The assembly according to claim 1, wherein a rolling ball is pivotally disposed on said locking part and disposed to face said supporting member.

3. The assembly according to in claim 1, wherein said supporting member includes a slot formed opposite to said upper stem and a second supporting member disposed on said slot; said fitting portion is disposed on said second supporting member, and a spring is disposed between said second supporting member and said slot.

4. The assembly according to in claim 1, wherein a brake fixing device is disposed between said upper stem and said brake handle; said brake fixing device comprising a housing fixed to said upper frame, a sliding part disposed inside said upper frame for allowing said upper stem to be disposed thereon, a retrieving part disposed between said sliding part and said housing, an activating part pivotally disposed on said housing and driven by said brake handle, and a connecting part respectively connected to said sliding part and said activating part; a wing being extended outward from said activating part, and a protrusion being extended at one end of said brake handle for propelling said wing.

* * * * *